(12) United States Patent
Takahashi et al.

(10) Patent No.: US 11,127,379 B2
(45) Date of Patent: Sep. 21, 2021

(54) DISPLAY DEVICE, CONTROL DEVICE, AND ELECTRONIC APPARATUS

(71) Applicant: SHARP KABUSHIKI KAISHA, Sakai (JP)

(72) Inventors: Junya Takahashi, Sakai (JP); Syuji Tanaka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/515,858

(22) Filed: Jul. 18, 2019

(65) Prior Publication Data

US 2020/0051530 A1 Feb. 13, 2020

(30) Foreign Application Priority Data

Aug. 7, 2018 (JP) .............................. JP2018-148602

(51) Int. Cl.
| | | |
|---|---|---|
| *G09G 5/373* | (2006.01) | |
| *G09G 5/38* | (2006.01) | |
| *G06K 9/00* | (2006.01) | |
| *G06F 3/041* | (2006.01) | |
| *H04M 1/02* | (2006.01) | |
| *G06F 1/16* | (2006.01) | |

(52) U.S. Cl.
CPC ......... *G09G 5/373* (2013.01); *G06K 9/00013* (2013.01); *G09G 5/38* (2013.01); *G06F 1/1637* (2013.01); *G06F 3/041* (2013.01); *H04M 1/0264* (2013.01)

(58) Field of Classification Search
CPC ............ G09G 5/373; G09G 5/38; G09G 3/20; G09G 2354/00; G09G 2340/045; G09G 2340/0464; G06K 9/00013; G06F 3/041; G06F 1/1637; G06F 1/1609; H04M 1/0264; H04M 1/0277
USPC .......................................... 345/156, 173–178
See application file for complete search history.

(56) References Cited

U.S. PATENT DOCUMENTS

| | | | | |
|---|---|---|---|---|
| 2015/0092122 A1* | 4/2015 | Youn | ...................... | G02B 5/201 349/12 |
| 2017/0289324 A1* | 10/2017 | Yeo | ......................... | G03B 29/00 |
| 2018/0017996 A1* | 1/2018 | Ryu | ...................... | G06F 1/1643 |
| 2018/0089492 A1* | 3/2018 | Cai | ......................... | H04N 5/247 |

FOREIGN PATENT DOCUMENTS

| | | |
|---|---|---|
| CN | 106662900 A | 5/2017 |
| CN | 207184550 U | 4/2018 |
| JP | 2014-099709 A | 5/2014 |

* cited by examiner

*Primary Examiner* — Jimmy H Nguyen
(74) *Attorney, Agent, or Firm* — ScienBiziP, P.C.

(57) ABSTRACT

A display device that is included in an electronic apparatus includes: a display panel that displays video; and a cover panel that is arranged while being superimposed on a front surface of the display panel and protects the display panel. An opening is formed in at least a portion of the cover panel and a device that performs input and output of prescribed information is provided in the opening.

7 Claims, 5 Drawing Sheets

FIG.3
(a)
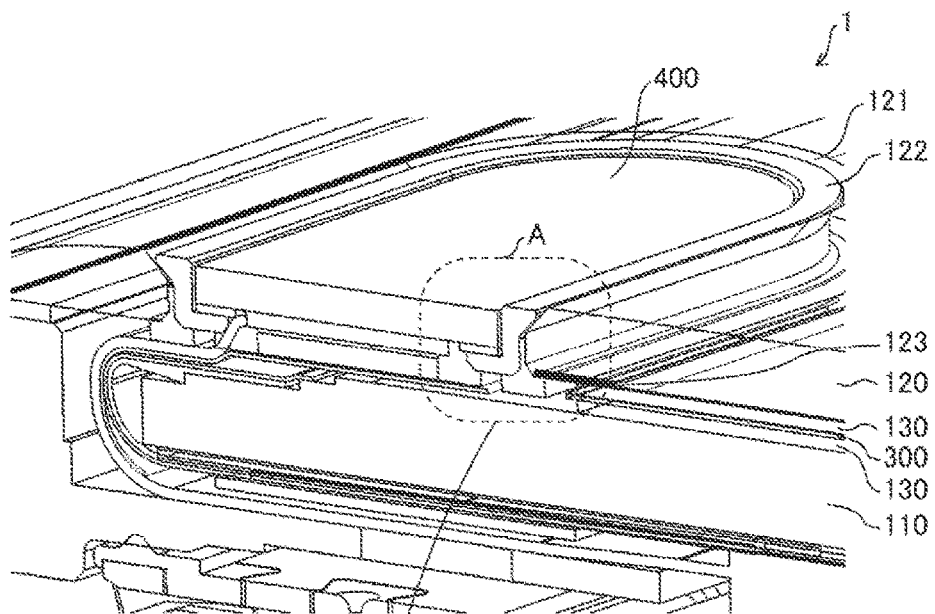
(b)
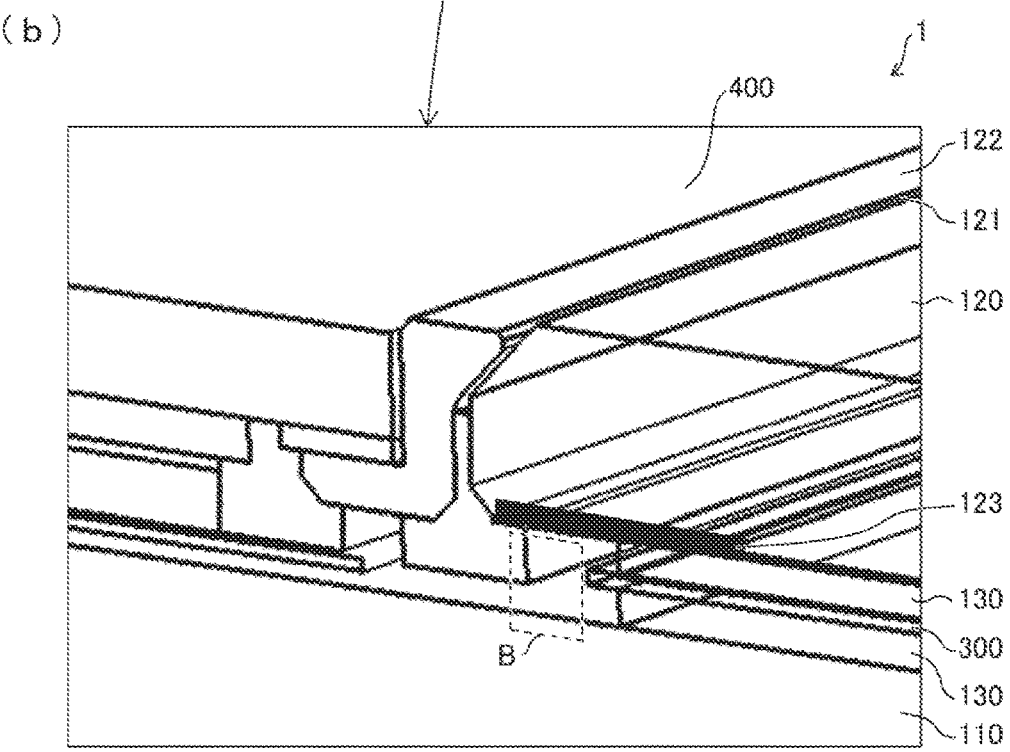

DISPLAY DEVICE, CONTROL DEVICE, AND ELECTRONIC APPARATUS

BACKGROUND

1. Field

The present disclosure relates to a display device and so forth provided to an electronic apparatus.

2. Description of the Related Art

In an electronic apparatus that includes a display device, a configuration has been known as related art, in which a different device from the display device is provided on the same side as the display device. For example, Japanese Unexamined Patent Application Publication No. 2014-99709 (laid open on May 29, 2014) discloses a configuration in which cover panel which covers a display is pasted onto peripheral edges of a front side cabinet which houses the display and a pressing type button is arranged in a region of the cover panel and on the outside of a display area.

However, related art as described above has a problem in that the pressing type button has to be arranged on the outside of a display area and the display area thus becomes small in a case where the external dimensions of an electronic apparatus may not be made large. In other words, the size of the display has to be restricted in order to arrange the pressing type button.

It is desirable to provide a display device and so forth that increase flexibility of design.

SUMMARY

A display device according to one aspect of the present disclosure is configured as a display device that is included in an electronic apparatus, the display device including: a display panel that displays video; and a cover panel that is arranged while being superimposed on a front surface of the display panel and protects the display panel, in which an opening is formed in at least a portion of the cover panel and a device that performs input and output of prescribed information is provided in the opening.

An electronic apparatus according to one aspect of the present disclosure is configured as an electronic apparatus including: at least one display device; and at least one control device, in which the display device includes: a display panel that displays video; and a cover panel that is arranged while being superimposed on a front surface of the display panel and protects the display panel, an opening is formed in at least a portion of the cover panel, a device that performs input and output or prescribed information and is used in the electronic apparatus is provided in the opening, and the control device performs control such that video is displayed on the display panel and performs input and output of the information through the device.

Advantageous Effects of Invention

An aspect of the disclosure advantageously provides a display device which increases flexibility of design.

Figure 4:
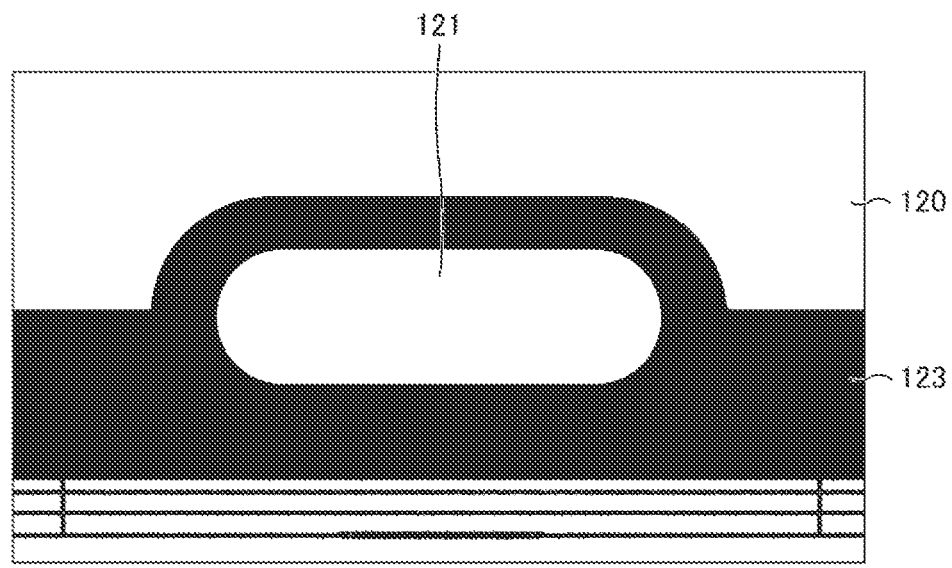
Figure 5:
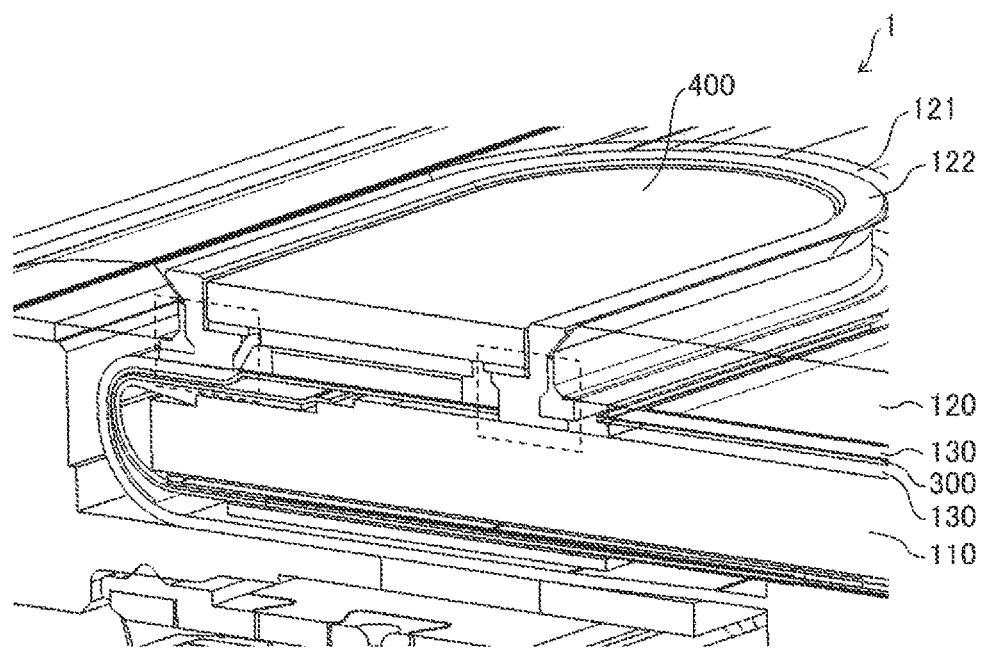
Figure 6:
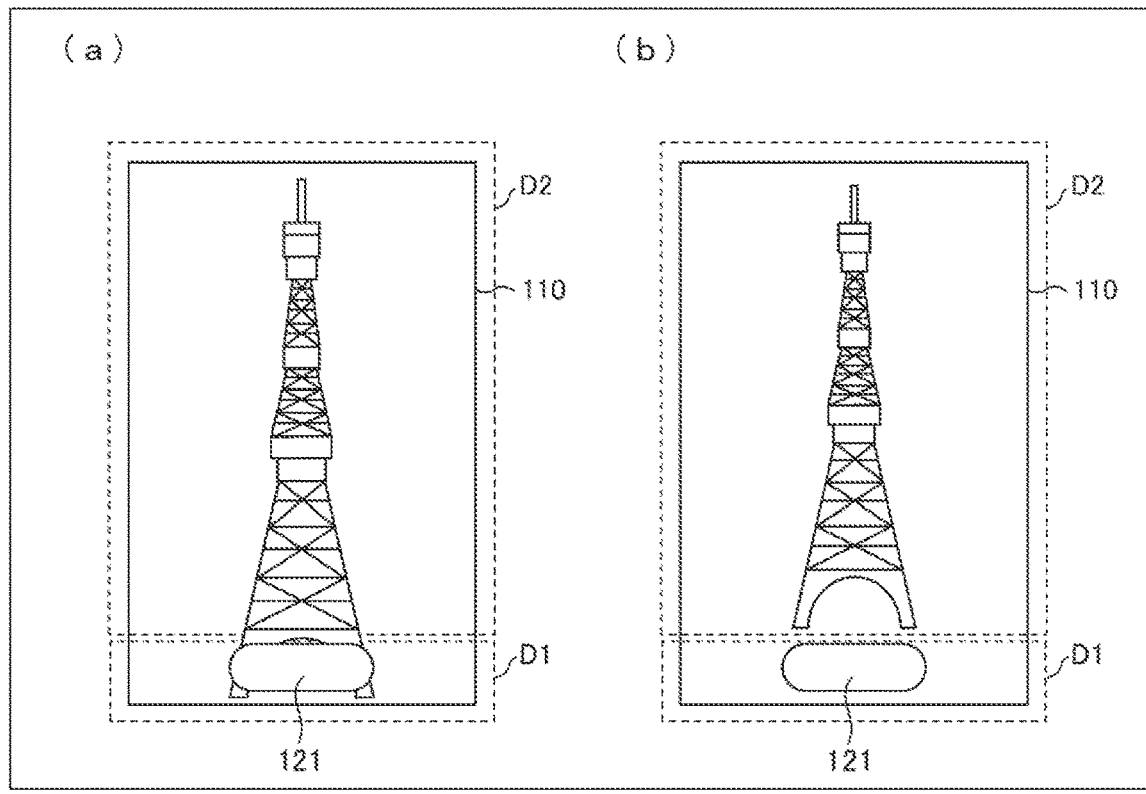
Figure 7:
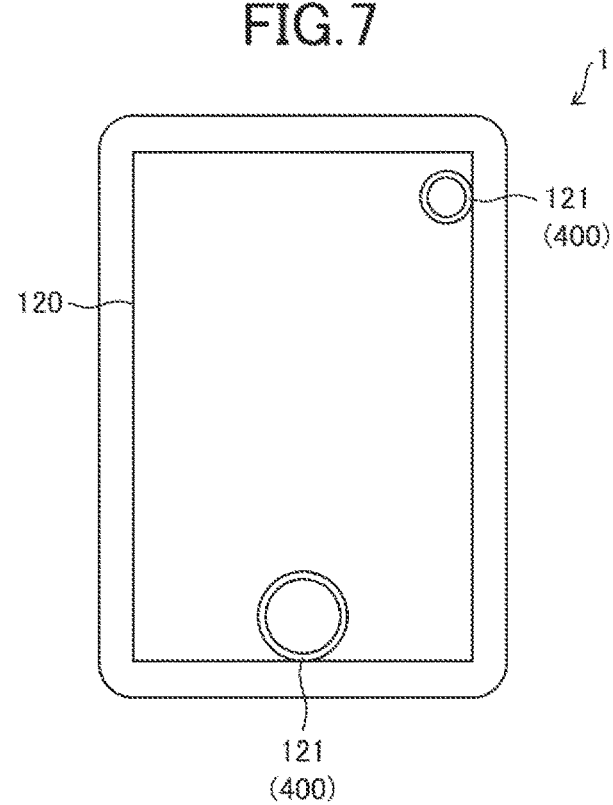

Portions (a) and (b) of FIG. 3 are schematic diagrams that illustrate one example of physical arrangement of various kinds of members in the electronic apparatus according to the first embodiment of the present disclosure, in which (a) of FIG. 3 is a cross-sectional diagram of a periphery of a device and (b) of FIG. 3 is an enlarged diagram of region IIIB indicated by a broken line in (a) of FIG. 3;

FIG. 4 is a schematic diagram that illustrates a specific example of a non-display region provided to the cover panel in the electronic apparatus according to the first embodiment of the present disclosure;

FIG. 5 is a schematic diagram that illustrates an example of a different shape of a fixing member in the electronic apparatus;

Portions (a) and (b) of FIG. 6 are schematic diagrams that illustrate an outline of reduced display of an image in a rectangular region in the display panel in the electronic apparatus according to a modification example of the present disclosure, in which (a) of FIG. 6 illustrates an example where an image is displayed in a first display region and a second display region and (b) of FIG. 6 illustrates an example where reduced display of the image is performed in the second display region; and FIG. 7 is a schematic diagram that illustrates an outline of the electronic apparatus according to a modification example of the present disclosure.

DESCRIPTION OF THE EMBODIMENTS

First Embodiment

One embodiment of the present disclosure will hereinafter be described in detail with reference to FIGS. 1 to 5.

Outline of Electronic Apparatus

Figure 2:
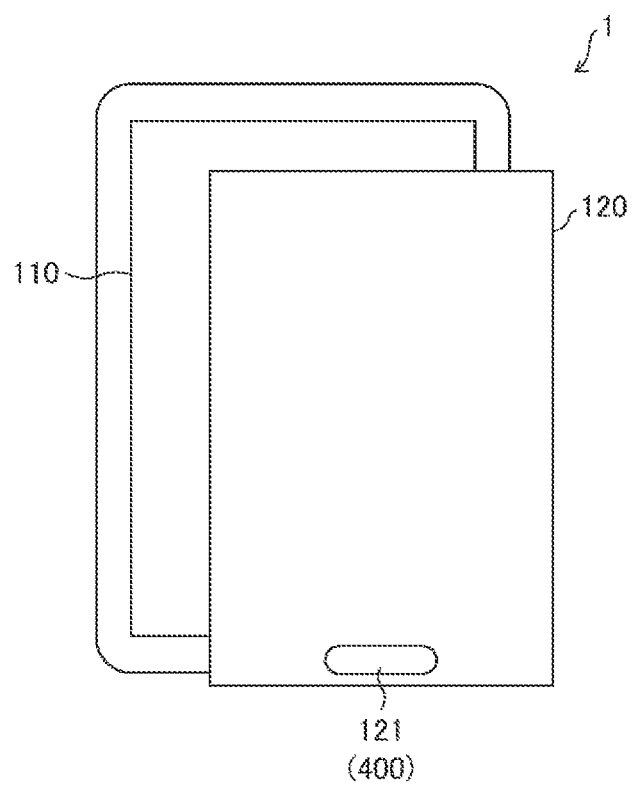
FIG. 2 is a schematic diagram that illustrates an outline of the positional relationship among a display panel, a cover panel, and an opening in the electronic apparatus according to the first embodiment of the present disclosure.

An outline of an electronic apparatus 1 according to this embodiment will be described with reference to FIG. 2. FIG. 2 is a schematic diagram that illustrates an outline of the positional relationship among a display panel 110, a cover panel 120, and an opening 121 in the electronic apparatus 1.

The electronic apparatus 1 is a smartphone that includes the display panel 110 which displays video, for example. Further, the electronic apparatus 1 includes the cover panel 120 that is arranged while being superimposed on a front surface of the display panel 110 and protects the display panel 110. That is, the whole surface of the display panel 110 is protected by the cover panel 120.

The opening 121 is formed in at least a portion of the cover panel 120. Further, a device 400 that performs input and output of prescribed information used in the electronic apparatus 1 is fixed to the opening 121 by a fixing member, which is not illustrated. The electronic apparatus 1 may execute input and output of information by using the device 400 provided to the opening 121 of the cover panel 120 in parallel with display of video by the display panel 110, for example.

Because the device 400 is arranged while being superimposed on the display panel 110, the size of the display panel 110 may be determined without consideration of the position and size of the device 400. For example, the display panel 110 with the size of whole one surface of the electronic apparatus 1 may be used for the electronic apparatus 1.

In such a manner, the electronic apparatus 1 according to this embodiment may enhance flexibility of design with respect to the arrangement and so forth of the display panel 110 compared to related art.

Configuration of Electronic Apparatus

Figure 1:
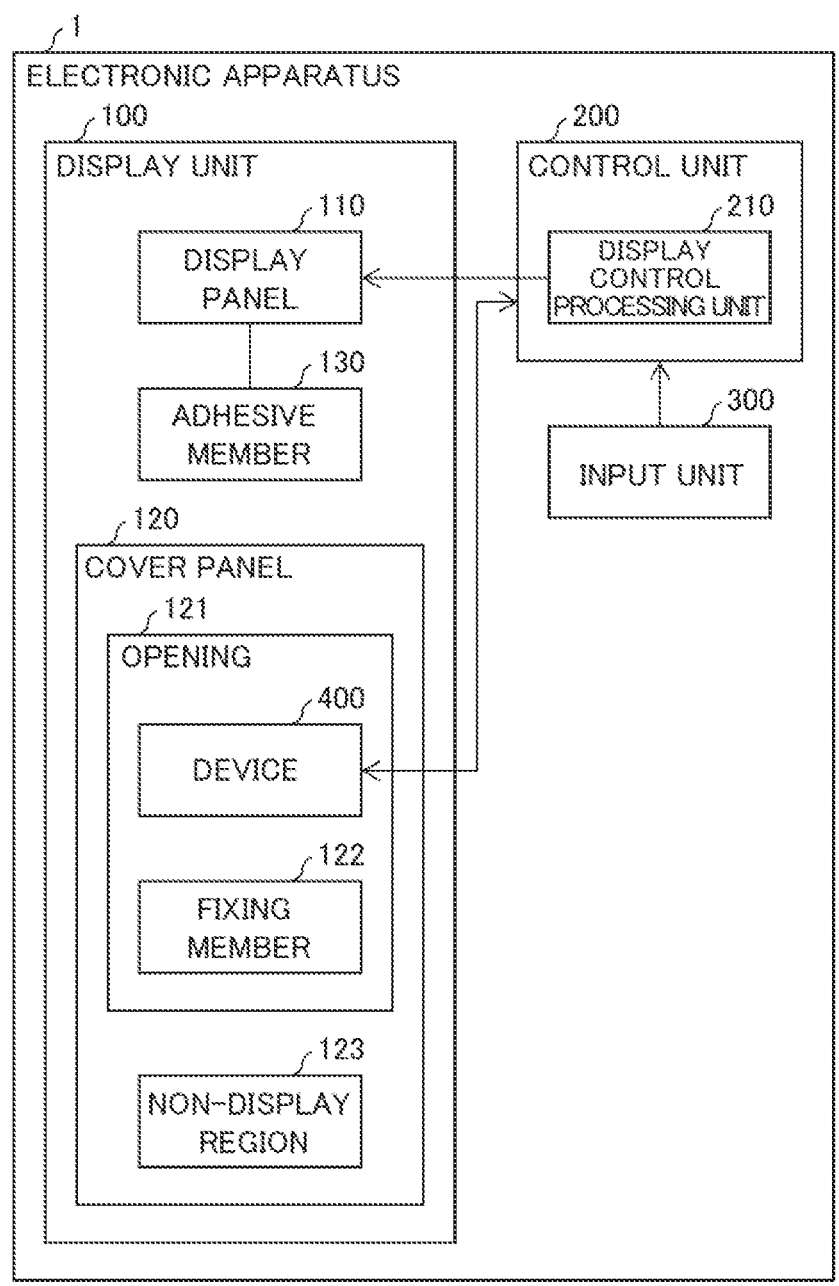
FIG. 1 is a block diagram that illustrates one example of a principal configuration of an electronic apparatus according to a first embodiment of the present disclosure.

A configuration of the electronic apparatus 1 according to this embodiment will be described with reference to FIG. 1. FIG. 1 is a block diagram that illustrates one example of a principal configuration of the electronic apparatus 1.

The electronic apparatus 1 includes a display unit 100, a control unit 200, and an input unit 300. The display unit 100 includes the display panel 110, the cover panel 120, and adhesive members 130. The cover panel 120 is provided with the opening 121, and the opening 121 is provided with a fixing member 122 and the device 400. The control unit 200 includes a display control processing unit 210.

The electronic apparatus 1 is a smartphone that includes at least one display unit 100 and at least one control unit 200, for example. The electronic apparatus 1 may be a tablet terminal, a laptop computer, or the like.

The display unit 100 is a liquid crystal display that functions as a display device included in the electronic apparatus 1, for example. The display unit 100 may have any configuration that is capable of displaying video and may be an organic EL display, for example.

The display panel 110 may display video in accordance with control by the display control processing unit 210. The display panel 110 may have a known configuration such as a liquid crystal panel or an organic EL panel as long as the configuration is capable of displaying video.

The cover panel 120 is arranged while being superimposed on the front surface of the display panel 110 and may protect the display panel 110. The cover panel 120 is desirably configured with a transparent material such as glass or plastic such that the video displayed on the display panel 110 may be viewed. The cover panel 120 is fixed to the front surface of the display panel 110 by the adhesive members 130, and the opening 121 is formed in at least a portion of the cover panel 120.

The cover panel 120 includes a non-display region 123, which causes a region of the display panel 110 on which the non-display region 123 is superimposed to be not displayed, around the opening 121. Details of the non-display region 123 will be described later.

The adhesive members 130 may adhere the display panel 110 to the cover panel 120. The adhesive member 130 is configured with a transparent member that has a certain thickness and has adhesiveness such as optical clear adhesive (OCA) tape that is used for adhesion of a display panel in smartphone, a tablet terminal, or the like, for example.

The opening 121 is an opening formed in at least a portion of the cover panel 120, and the device 400 is fixed to the opening by the fixing member 122. There is no particular restriction on the position or size of the opening 121. However, the opening 121 and the device 400 are desirably provided in the vicinity of an end of the cover panel 120 such that video on the display panel 110 may be displayed to a user without giving discomfort.

The fixing member 122 is an opaque member that fixes the device 400 to the opening 121. Fixing may be performed in any manner and may be by glue, which is not illustrated, or may be by a method such as screwing or welding. The fixing member 122 is arranged in a gap between the device 400 and the opening 121. The opaque fixing member is arranged in the gap, and the boundary between video displayed on the display panel 110 and the opening 121 may thereby be made clear. Further, light in an internal portion of a housing of the electronic apparatus 1 may be inhibited from leaking from the gap to the outside.

The non-display region 123 is a region that is provided to at least a portion of the cover panel 120 and may cause the region of the display panel 110 on which the non-display region 123 is superimposed to be not displayed. The non-display region 123 may be provided as a black-printed portion on the cover panel 120, for example. Further, the non-display region 123 is desirably provided such that a region of the display panel 110 which is not coated with the adhesive member 130 is not displayed.

The device 400 is a member that is provided in the opening 121 of the cover and 120 by the fixing member 122 and may perform input and output of prescribed information. The device 400 may be a fingerprint sensor that detects a fingerprint of the user, for example. The prescribed information may be data information about the fingerprint detected by the fingerprint sensor, and the data information is transmitted and received between the device 400 and the control unit 200.

The control unit 200 functions as a control device that integrally controls each unit of the electronic apparatus 1. The control unit 200 may generate an instruction that corresponds to an operation by the user which is accepted by the input unit 300 and may control each unit based on the instruction. The control unit 200 may perform transmission and reception of information between the control unit 200 and the device 400 and may cause the device 400 to input and output prescribed information.

The display control processing unit 210 may perform control of the display panel 110 in accordance with an instruction from the control unit 200. The display panel 110 is controlled by the display control processing unit 210 so as to display video. The display control processing unit 210 may control the display unit 100 such that video is not displayed in the region of the display panel 110 that is superimposed on the opening 121.

The input unit 300 functions as an input device that transmits a signal which corresponds to the accepted operation to the control unit 200 when the operation by the user is accepted. The input unit 300 may be a touch panel of a transparent member, which is integrally formed with the display panel 110, or may be a kind of physical button, for example.

Specific Example of Member Arrangement

A description will be made about a specific example of physical arrangement of a periphery of the device 400 the electronic apparatus 1 according to this embodiment with reference to (a) and (b) of FIG. 3. Portions (a) and (b) of FIG. 3 are schematic diagrams that illustrate one example of physical arrangement of various kinds of members in the electronic apparatus 1. Portion (a) of FIG. 3 is a cross-sectional diagram of the periphery of the device 400, and (b) of FIG. 3 is an enlarged diagram of region IIIB indicated by a broken line in (a) of FIG. 3. Note that in the following description, the surface of the cover panel 120 that contacts with the outside environment is set as a face surface, and the surface opposed to the adhesive members 130 and the display panel 110 is set as a back surface.

The member arrangement of the periphery of the device 400 will be described with reference to (a) of FIG. 3. The electronic apparatus 1 includes the cover panel 120 that is provided with the opening 121 and has a prescribed thickness. The fixing member 122 that has a substantially equivalent thickness to the cover panel 120 is embedded in the opening 121, and the device 400 is further embedded in the fixing member 122. The heights of the cover panel 120, the fixing member 122, and the device 400 are desirably adjusted such that those are substantially flush with each other. However, for example, the thickness of the device 400 and the depth of embedding may be adjusted such that the device 400 is arranged to be recessed in order to inhibit occurrence of an incorrect operation.

Further, the non-display region 123 is provided to at least a portion of the cover panel 120. In the example illustrated in (a) of FIG. 3, the non-display region 123 is formed on the back surface side of the cover panel 120 and in a peripheral edge portion of the fixing member 122 embedded in the opening 121.

Joining between the device 400 and the fixing member 122 and joining between the fixing member 122 and the cover panel 120 are performed with different glue from the adhesive member 130. The glue does not have to transmit the light related to the video displayed on the display panel 110 as the adhesive member 130 does and may thus be configured with an opaque material as long as the members may be joined together.

A description will be made about detailed arrangement of the display panel 110, the cover panel 120, the non-display region 123, and the adhesive members 130 with reference to (b) of FIG. 3. As illustrated in (b) of FIG. 3, the fixing member 122 is arranged in the opening 121 of the cover panel 120, and the device 400 is embedded in the fixing member 122. Further, in the cover panel 120, the non-display region 123 is formed in the peripheral edge portion of the fixing member 122.

All of the cover panel 120, the fixing member 122, and the device 400 are arranged while being superimposed on the face surface side of the display panel 110. Between the display panel 110 and the cover panel 120, two adhesive members 130 are arranged in a state where the input unit 300 as a touch panel is interposed. Accordingly, the display panel 110, the cover panel 120, and the input unit 300 are arranged while being fixed to each other by the adhesive members 130.

In (b) of FIG. 3, a region B in which the two adhesive members 130 and the input unit 300 are not arranged is present between the display panel 110 and the cover panel 120 in the peripheral edge portion of the opening 121. Because it is assumed that the video displayed on the display panel 110 is transmitted through the two adhesive members 130, the input unit 300, and the cover panel 120, the light that passes through the region B may make an adverse influence on the video as a whole. That is, a problem such as display deviation of the light of video emitted by the display panel 110 may occur due to the difference in the refractive index of light based on presence or absence of the adhesive member 130 or the like. Thus, the non-display region 123 is desirably formed to include the whole region B.

Various kinds of members are arranged in such a manner, and the electronic apparatus 1 may thereby be configured which appropriately performs display of video by using the display panel 110 and input and output of information by using the device 400.

Specific Example of Non-display Region

A description will be made about a specific example of the non-display region 123 provided to the cover panel 120 in the electronic apparatus 1 according to this embodiment with reference to FIG. 4. FIG. 4 is a schematic diagram that illustrates specific example of the non-display region 123.

In FIG. 4, a peripheral portion of the opening 121 in the cover panel 120 is enlarged. In FIG. 4, the black portion indicates the non-display region 123. As illustrated in FIG. 4, the non-display region 123 is provided around the opening 121 and covers the region of the display panel 110 on which the non-display region 123 is superimposed (a display region is concealed).

In the above configuration, the size of the display panel 110 may be determined in the electronic apparatus 1 according to this embodiment without consideration of the position or size of the device 400. Thus, for example, the display panel 110 with the size of whole one surface of the electronic apparatus 1 may be used for the electronic apparatus 1. Consequently, an effect is provided in which the electronic apparatus 1 and so forth which increase flexibility of design may be realized.

A different joining example from (a) and (b) of FIG. 3 will be described with reference to FIG. 5. FIG. 5 is a schematic diagram that illustrates an example of a different shape of the fixing member 122.

In the example illustrated in FIG. 5, a basic configuration is the same as (a) and (b) of FIG. 3, but the shape of the fixing member 122 is different. Specifically, a portion of the fixing member 122, which is indicated by a broken-line frame in FIG. 5, is configured as a shape that protrudes to be opposed to the back surface of the cover panel 120. In this case, because a protruded portion of the fixing member 122 is fixed by the cover panel 120 even if the fixing member 122 is not joined to the display panel 110, the fixing member 122 may be inhibited from peeling from the opening 121. Here, for example, the fixing member 122 may be joined to the cover panel 120 by glue or the like and may thereby be fixed more firmly.

Modification Examples

In the first embodiment, the electronic apparatus 1 has a configuration in which video is displayed on the whole display panel 110 and video is not displayed in the opening 121 and in the region in which the non-display region 123 provided to surroundings of the opening 121 is superimposed. However, a configuration is possible which may perform reduced display of whole video in a portion of the region of the display panel 110 such that the user may view the whole video desired to be displayed, for example.

A modification example of the present disclosure will be described with reference to (a) and (b) of FIG. 6. Portions (a) and (b) of FIG. 6 are schematic diagrams that illustrate an outline of reduced display of an image in a rectangular region in the display panel 110 in the electronic apparatus 1 according to the modification example. Portion (a) of FIG. 6 illustrates an example where an image is displayed in a first display region and a second display region, and (b) of FIG. 6 illustrates an example where reduced display of the image is performed in the second display region. Note that in the following description, the display panel 110 includes a first display region D1 in at least a portion of which the opening 121 is formed and a rectangular second display region D2 that is another display region than the first display region D1.

Portion (a) of FIG. 6 illustrates an example where video of a tower is displayed on the whole display panel 110 that includes both of the first display region D1 and the second display region D2. As illustrated in (a) of FIG. 6, the video of the tower may not be viewed in the periphery of the opening 121.

Compared to (a) of FIG. 6, (b) of FIG. 6 illustrates an example where reduced display of the whole video of the tower is performed in the second display region D2 without using the first display region D1 for display of the video. As illustrated in (b) of FIG. 6, because the second display region D2 does not include the opening 121 and the periphery, the whole tower may be viewed.

This modification example may be realized by a configuration in which the display control processing unit 210 controls the display unit 100 such that reduced display of video is performed in the second display region D2, for example. The display control processing unit 210 may be switchable such that the display control processing unit 210 normally displays video on the whole display panel 110 that includes both of the first display region D1 and the second display region D2 but performs reduced display of whole video in the second display region D2 in accordance with request. For example, the display control processing unit 210 may switch display in a case where the input unit 300 accepts a prescribed input. Accordingly, for example, in a case where the displayed content may not be checked due to the device 400 or the like when video is displayed on the whole display panel 110, the whole video may be checked by performing reduced display of the video in the rectangular second display region D2.

In the first embodiment, an example is raised where the device 400 is a fingerprint sensor. However, the device 400 may be configured to output prescribed information in accordance with an instruction from the control unit 200, for example. For example, the device 400 may be an LED light that is capable of emitting light while changing colors, flashing speeds, or the like.

Further, the electronic apparatus 1 may include plural different kinds of devices 400. A description will be made about an outline of the electronic apparatus 1 that includes plural devices 400 with reference to FIG. 7. FIG. 7 is a schematic diagram that illustrates an outline of the electronic apparatus 1 according to a modification example. In the example illustrated in FIG. 7, two openings 121 are formed in the cover panel 120 of the electronic apparatus 1, and the device 400 is arranged in each opening 121. Here, the sizes and positions of the two openings 121 may be changed in accordance with the kinds or purposes of the devices 400 arranged in the openings 121.

Examples of Realization by Software

A control block of the electronic apparatus 1 (particularly the display control processing unit 210) may be realized by logic circuits (hardware) that are formed on an integrated circuit (IC chip) or the like or may be realized by software.

In the latter case, the electronic apparatus 1 includes a computer that executes commands of a program, which is software for realizing functions. This computer includes at least one processor (control device) and includes at least one recording medium that stores the program and is computer-readable, for example. Further, in the computer, the processor reads the program from the recording medium and executes the program, and purposes of the present disclosure are thereby achieved. As the processor, a central processing unit (CPU) may be used, for example. As the recoding medium, "non-transitory tangible medium", for example, a read-only memory (ROM), a tape, a disk, a card, a semiconductor memory, a programmable logic circuit, or the like may be used. Further, a random access memory (RAM) or the like into which the program is loaded may further be included. Further, the program may be supplied to the computer via an arbitrary transmission medium that is capable of transmitting the program (such as a communication network or a broadcast wave). Note that one aspect of the present disclosure may be realized by a mode of data signals embedded in a carrier, in which the program is shaped by electronic transmission.

CONCLUSION

A display device according to a first aspect of the present disclosure is configured as a display device that is included in an electronic apparatus, the display device including: a display panel that displays video; and a cover panel that is arranged while being superimposed on a front surface of the display panel and protects the display panel, in which an opening is formed in at least a portion of the cover panel and a device that performs input and output of prescribed information is provided in the opening.

In the above configuration, the electronic apparatus may execute input and output of information by using the device provided to the opening of the cover panel in parallel with display of video, for example. Further, the size of the display panel may be determined without consideration of the position or size of the device. Thus, for example, the display panel with the size of whole one surface of the electronic apparatus may be used for the electronic apparatus. Consequently, an effect is provided in which the display device which increases flexibility of design may be realized.

In the first aspect, the display device according to a second aspect of the present disclosure may have a configuration in which the device is fixed to the opening by an opaque fixing member and the fixing member is arranged in a gap between the device and the opening. In the above configuration, because the opaque fixing member is arranged in the gap between the device and the opening, light in an internal portion of the display device may be inhibited from leaking from the gap.

In the first or second aspect, the display device according to a third aspect of the present disclosure may have a configuration in which the display panel and the cover panel are joined to each other by an adhesive member, the cover panel includes a non-display region, which causes a region of the display panel on which the non-display region is superimposed to be not displayed, around the opening, and the non-display region causes at least a region, in which the adhesive member is not arranged between the display panel and the cover panel, to be not displayed.

In the above configuration, the electronic apparatus may use the non-display region to cause video on the display panel to be not displayed in the region in which the adhesive member is not arranged between the display panel and the cover panel. Accordingly, for example, display deviation of video due to the difference in the refractive index of light based on presence or absence of the adhesive member may be made unviewable.

In any one of the first to third aspects, the display device according to a fourth aspect of the present disclosure may have a configuration in which the device is a fingerprint sensor that detects a fingerprint of a user. In the above configuration, the display panel and the fingerprint sensor may be arranged on the same surface in the electronic apparatus. Accordingly, differently from the electronic apparatus in which the fingerprint sensor is arranged on a surface on the opposite side to the display panel, for example, display of video and detection of a fingerprint may simultaneously be performed in a state where the electronic apparatus is put on a desk.

A control device according to a fifth aspect of the present disclosure that controls the display device may be configured as a control device that controls the display device in any one of the first to fourth aspects and includes a display control processing unit that controls the display device such that video is displayed on the display panel. In the above configuration, the electronic apparatus may display video on the display panel without consideration of the arrangement of the device.

In the fifth aspect, the control device according to a sixth aspect of the present disclosure may have a configuration in which the control device performs transmission and reception of information between the control device and the device and causes the device to input and output prescribed information. In the above configuration, the electronic apparatus may execute display of video and input and output of prescribed information.

In the fifth or sixth aspect, the control device according to a seventh aspect of the present disclosure may have a configuration in which the display control processing unit controls the display device such that video is not displayed in a region of the display panel that is superimposed on the opening.

In the above configuration, the electronic apparatus does not display video in the region of the display panel on which the opening of the cover panel is superimposed, that is, the region in which the device is arranged while being superimposed. Display of video in the region on which the device is superimposed is inhibited, and wasted power consumption may thereby be inhibited.

In any one of the fifth to seventh aspects, the control device according to an eighth aspect of the present disclosure may have a configuration in which the display panel includes: a first display region in at least a portion of which the opening is formed, and a rectangular second display region that is another display region than the first display region and in which the display control processing unit controls the display device such that reduced display of the video is performed in the second display region.

In the above configuration, the electronic apparatus may perform reduced display of video in the rectangular second display region included in the display panel. Accordingly, for example, in a case where the displayed content may not be checked due to the device or the like when video is displayed on the whole display panel, the displayed content may be checked by performing reduced display in the rectangular region.

An electronic apparatus according to a ninth aspect of the present disclosure is configured as an electronic apparatus including: at least one display device; and at least one control device, in which the display device includes: a display panel that displays video; and a cover panel that is arranged while being superimposed on a front surface of the display panel and protects the display panel, an opening is formed in at least a portion of the cover panel, a device that performs input and output of prescribed information and is used in the electronic apparatus is provided in the opening, and the control device performs control such that video is displayed on the display panel and performs input and output of the information through the device. In the above configuration, similar actions and effects to the first aspect may be provided.

The control devices according to the aspects of the present disclosure may be realized by a computer. In this case, a control program of the control device, which causes the computer to act as each unit (software element) included in the control device and thereby realizes the control device with the computer, and a computer-readable recording medium that records the control program are included in the purview of the present disclosure.

The present disclosure is not limited to the above-described embodiments. Various kinds of alterations are possible in the scope described in claims, and embodiments that are obtained by appropriately combining technical measures disclosed in the different embodiments are included in the technical scope of the present disclosure. In addition, new technical features may be formed by combining technical measures that are disclosed in the embodiments.

The present disclosure contains subject matter related to that disclosed in Japanese Priority Patent Application JP 2018-148602 filed in the Japan Patent Office on Aug. 7, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device that is included in an electronic apparatus, the display device comprising:
   a display panel that displays video; and
   a cover panel that is arranged while being superimposed on a front surface of the display panel and protects the display panel, wherein
   an opening is formed in a portion of the cover panel and a device that performs input and output of prescribed information is provided in the opening, wherein
   the device and the opening are superimposed on a displaying area where the display panel displays video in a plan view,
   the display panel and the cover panel are joined to each other by an adhesive member,
   the cover panel includes a non-display portion provided around the opening so as to cover and conceal a portion of the display panel,
   there is a non-adhesive region where the adhesive member is not arranged and the non-adhesive region is formed by a gap provided between the display panel and the cover panel, wherein the non-adhesive region exists in the displaying area in a plan view, and
   the non-display portion covers and conceals the non-adhesive region.

2. The display device according to claim 1, wherein the device is a fingerprint sensor that detects a fingerprint of a user.

3. A control device that controls the display device according to claim 1, the control device comprising:
   a display control processing unit that controls the display device such that video is displayed on the display panel.

4. The control device according to claim 3, wherein the control device performs transmission and reception of information between the control device and the device and causes the device to input and output prescribed information.

5. The control device according to claim 3, wherein the display control processing unit controls the display device such that video is not displayed in a region of the display panel that is superimposed on the opening.

6. The control device according to claim 3, wherein the display panel includes a first display region in at least a portion of which the opening is formed, and a rectangular second display region that is another display region being different from the first display region, and the display control processing unit controls the display device such that reduced display of the video is performed in the second display region.

7. An electronic apparatus comprising:

at least one display device; and at least one control device, wherein the display device includes a display panel that displays video, and a cover panel that is arranged while being superimposed on a front surface of the display panel and protects the display panel, an opening is formed in a portion of the cover panel, and a device that performs input and output of prescribed information and is used in the electronic apparatus is provided in the opening, and the device and the opening are superimposed on a displaying area where the display panel displays video in a plan view, the control device performs control such that video is displayed on the display panel and performs input and output of the information through the device, wherein the display panel and the cover panel are joined to each other by an adhesive member, the cover panel includes a non-display portion provided around the opening so as to cover and conceal a portion of the display panel, there is a non-adhesive region where the adhesive member is not arranged and the non-adhesive region is formed by a gap provided between the display panel and the cover panel, wherein the non-adhesive region exists in the displaying area in a plan view, and the non-display portion covers and conceals the non-adhesive region.

\* \* \* \* \*